United States Patent [19]

Lay

[11] 4,318,565
[45] Mar. 9, 1982

[54] STATOR APPARATUS FOR A MOVING VEHICLE

[75] Inventor: Giles P. Lay, Sulphur, Okla.

[73] Assignee: Layco, Inc., Sulphur, Okla.

[21] Appl. No.: 133,614

[22] Filed: Mar. 24, 1980

Related U.S. Application Data

[63] Continuation of Ser. No. 544,043, Jan. 27, 1975, abandoned.

[51] Int. Cl.³ .............................................. B62D 37/02
[52] U.S. Cl. ...................................................... 296/1 S
[58] Field of Search ..................................... 296/1 S, 91

[56] References Cited

U.S. PATENT DOCUMENTS

| | | | |
|---|---|---|---|
| 1,871,396 | 8/1932 | Stalker | 296/1 S |
| 2,361,924 | 11/1944 | Boynton | 296/1 S |
| 2,863,695 | 12/1958 | Stamm | 296/1 S |
| 3,328,074 | 6/1967 | Van Rossem | 296/1 S |
| 3,455,594 | 7/1969 | Hall et al. | 296/1 S |
| 3,799,603 | 3/1974 | Bott | 296/1 S |
| 4,159,843 | 7/1979 | Crossman | 296/91 X |

FOREIGN PATENT DOCUMENTS

| | | | |
|---|---|---|---|
| 1072112 | 12/1959 | Fed. Rep. of Germany | 296/1 S |
| 2729601 | 1/1978 | Fed. Rep. of Germany | 296/1 S |
| 1192862 | 10/1959 | France | 296/1 S |
| 1336673 | 7/1963 | France | 296/1 S |

*Primary Examiner*—David M. Mitchell

[57] ABSTRACT

A vehicular streamlining improvement for vehicles that form an air wake behind the vehicle wherein the wake moves forward faster than the vehicle moves forward, particularly pickup trucks. The improvement being an air directing assembly arranged as a stator assembly for the development of multiple, concentric and generally parallel streams of rearward flowing air so as to energize the wake in a manner which changes the factors responsible for the forward accelerations within the air of the wake.

2 Claims, 7 Drawing Figures

STATOR APPARATUS FOR A MOVING VEHICLE

CROSS REFERENCE

This application is a continuation of U.S. patent application Ser. No. 544,043 filed Jan. 27, 1975 and now abandoned.

BACKGROUND OF THE INVENTION

The present invention relates generally to the field of airflow directing devices used for streamlining purposes. More particularly, but not by way of limitation, the present invention relates to a stator apparatus for minimizing the drag effect experienced by pickup trucks and the like which move through ambient atmospheric air.

The body of prior art associated with the use of air directing means in various automotive adaptations is to be found in the U.S. Patent and Trademark Office archives under the 296 classification with sub-classifications such as 1.5, 1 S and 1 SX. Some of the specific patents within this broad area of the field of the invention include: Stalker, U.S. Pat. No. 1,871,396; Boynton, U.S. Pat. No. 2,361,924; Stamm, U.S. Pat. No. 2,863,695; Van Rossen, U.S. Pat. No. 3,328,074; Hall et al., U.S. Pat. No. 3,455,594; Bott, U.S. Pat. No. 3,799,603; and Villipe, France Pat. No. 1336673.

All known prior art in the field of automotive streamlining provides structural arrangements for the reduction of air drag and turbulence around forward moving vehicles by manipulation of that air which is caused to move, relatively, from the front of the vehicle to the rear of the vehicle. Such prior art arrangements are inoperable in those special circumstances where the forward movement of the vehicle establishes a reversed air movement from the rear of the vehicle towards the front with a velocity greater than the forward velocity of the vehicle.

All conventional pickup trucks exhibit such reversed wind flow characteristics when operated at highway speeds. In such instances a high velocity wind develops aft of the tailgate and sweeps forward through the bed and around any cargo that may be disposed therein. Such forward sweeping wind is so strong and so turbulent that it will often eject unsecured cargo from the bed or, if the cargo is secured by tie-downs, create wind damage in excess of the wind damage that would be expected if such cargo was exposed to only the rearward flowing wind created by the forward vehicular motion.

The direction, intensity and turbulence of the forward flowing winds that develop within and around pickup truck beds are of such nature that prior art provisions for controlling rearward flowing air cannot be obviously modified for suitable control of forward flowing winds.

SUMMARY OF THE INVENTION

The present invention provides for wake energization, a term of established meaning in the field of aeronautical streamlining but not in common use in the field of automotive streamlining and which is therefore defined immediately hereafter.

Under certain circumstances the wake of an object moving through ambient air will couple with the bow wave created by the moving object and thereby increase the amount of air moved as well as the velocities of such movement. Such air movement is the result of a transfer of kinetic energy from the moving object to the ambient air and the greater the transfer of kinetic energy the greater the air resistance encountered by the object. Wake energization involves a controlled transfer of kinetic energy into a portion of the flowing air so that the energized air can be directed into the wake as a means of preventing the wake from coupling with the bow wave. The bow wave, as used herein, refers to the ambient air that is displaced by the forward portion of the object being moved through the air. The wake, as used herein, refers to the ambient air caused to follow a moving object.

An object of the present invention is to provide an air directing means for combination with a conventional vehicle whereby the mass of ambient air disturbed by the relative motion between the ambient air and the moving vehicle can be minimized so as to reduce the transfer of kinetic energy from the vehicle and thus decrease air drag.

Another object of the present invention is to provide a stator apparatus for a vehicle that will achieve the above stated object while offsetting the actual increased total vehicular weight by an aerodynamic lifting action so as to functionally reduce the effective weight while traveling at highway speeds so that the rolling resistance, as well as the air drag resistance, is lowered.

Another object of the present invention, while achieving the above stated objects, is to provide a stator assembly capable of shading the cap portion of the vehicle from the direct rays of the sun as a means of reducing reflected glare from glassed surfaces that tend to interfere with vision and as a means of reducing the amount of solar heating affecting such area so as to reduce the need for, or size of, cooling mechanisms intended for comfort.

Another object of the present invention, while achieving the above stated objects, is to provide a stator assembly that offers ease of installation, minimum upkeep and economy of manufacture.

Another object of the present invention, while achieving the above stated objects, is to provide a stator assembly that will not impede the functional load capacity of the vehicle while achieving a measure of cargo wind protection which would otherwise require the installation of cargo covering means.

Other objects, advantages and features of the present invention will become apparent when the following detailed description is read in conjunction with the accompanying drawings and following claims.

BRIEF DESCRIPTION OF THE DRAWINGS

FIG. 3 is a rear view of the stator assembly of FIG. 2, with

DESCRIPTION OF THE PREFERRED EMBODIMENT

Figure 1:
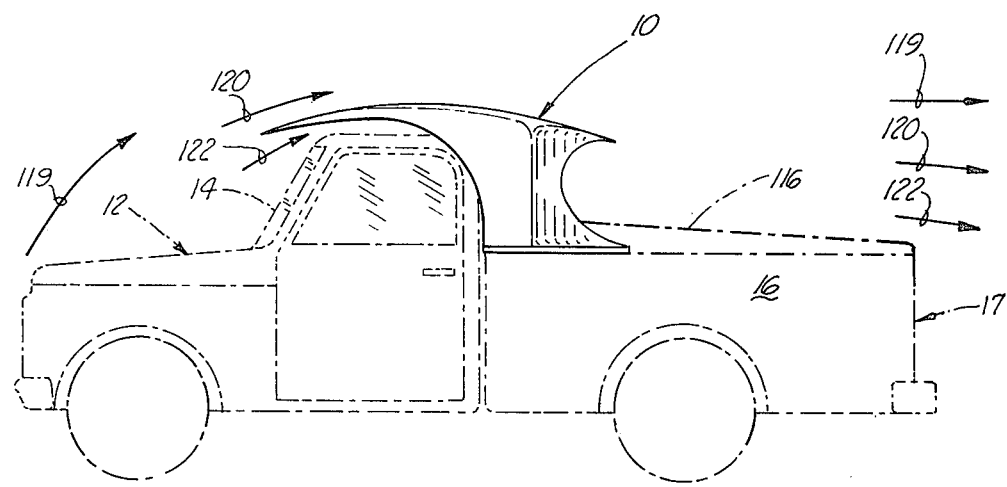
FIG. 1 is a side view of a stator apparatus constructed in accordance with the present invention as shown mounted on a pickup truck.

Referring to the drawings in general and to FIG. 1 particularly, the stator assembly 10 is shown mounted in a mid-vehicular position so as to partially encompass and surround the cab 14 of the pickup truck 12. While the stator assembly 10 is shown mounted on a conventional pickup truck in the present disclosure, it will be understood that the principal of the present invention may be applied to any other vehicle where the shape of the vehicle tends to create a wake that moves in the same direction as the vehicle and with a forward velocity that exceeds the forward velocity of the vehicle forming the wake.

Figure 2:
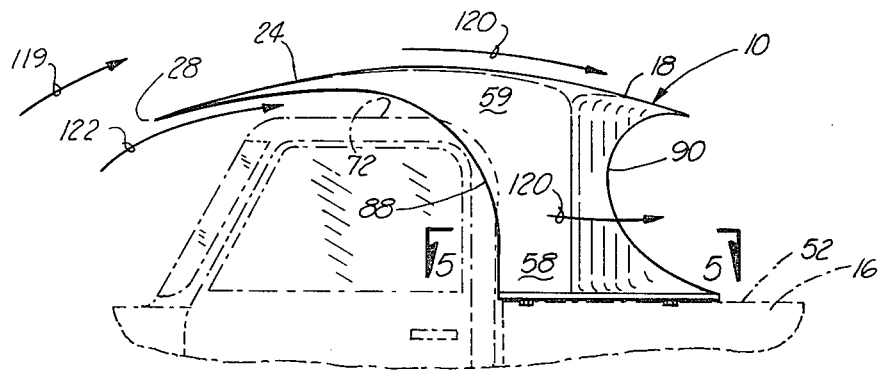
FIG. 2 is a larger view of the stator assembly of FIG. 1 shown in side elevational view.
Figure 3:
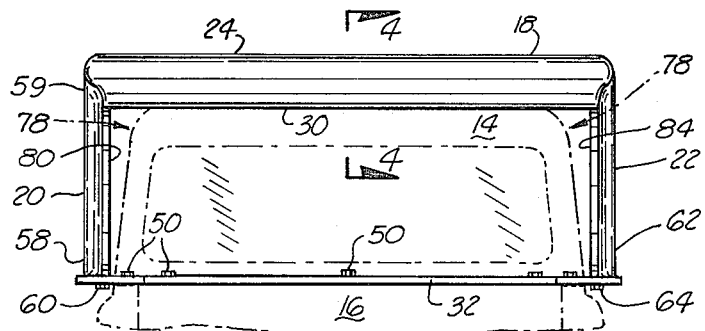

For purposes of clarity, the stator assembly 10 is shown in FIG. 2 in enlarged detail and, as in FIG. 1, the stator assembly 10 is mounted to the pickup truck 12 over the cab 14 ahead of the bed 16. The stator assembly 10 is comprised of a main stator member 18 and a pair of support stator members 20 and 22, which are more clearly discernable in the rear view of FIG. 3.

Figure 4:
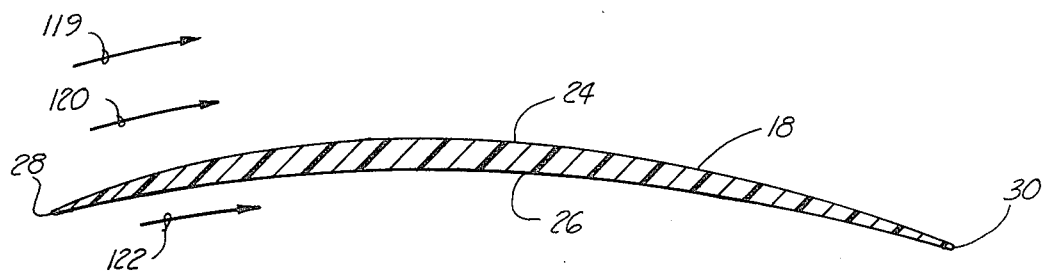
FIG. 4 is a cross-sectional view taken at 4—4 in FIG. 3.
Figure 5A:
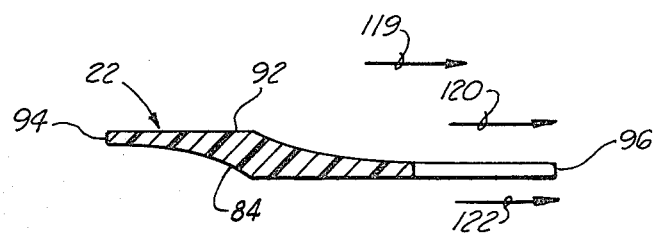
FIG. 5 is a cross-sectional view of one of the vertical support stators taken at 5—5 in FIG. 2, with FIG. 5A as a similar view of the other vertical support stator.
Figure 5:
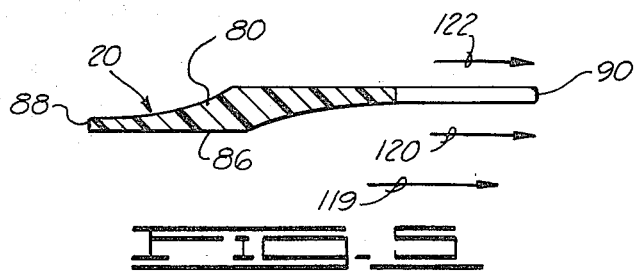

The main stator member 18 is generally a horizontally disposed member elongated in dimensions so as to exceed the dimensions of the cab 14 and positioned at a predetermined distance, and with a predetermined degree of angularity, therefrom. The main stator member 18 has a preferred cross-sectional profile as shown in FIG. 4 but functional results are not necessarily dependent upon any peculiar profile limitation. The external surface 24 and the internal surface 26 meet to form a forward air shearing edge 28 and a trailing flow directing edge 30. The first support stator 20 has an internal surface 80 and an external surface 86 that meet to form a forward air shearing edge 88 and to form a trailing flow directing edge 90, as discernible in FIG. 5. The second support stator 22 has an internal surface 84 and an external surface 92 that meet to form a forward air shearing edge 94 and to form a trailing flow directing edge 96, as discernible in FIG. 5A.

Figure 3A:
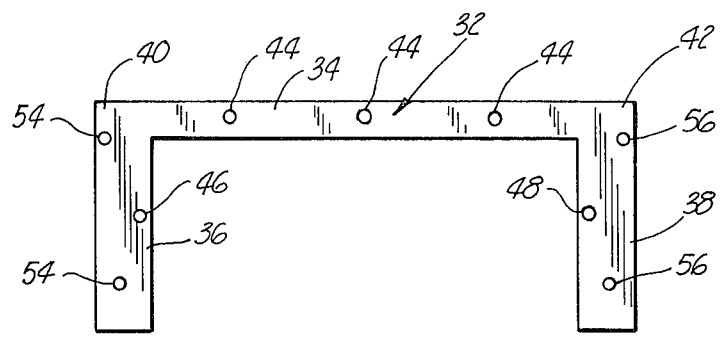
FIG. 3A as a top plan view of the base of the stator assembly.

The first support stator 20 and the second support stator 22 extend generally vertically to provide support means for the main stator 18. A platform base 32 is provided at the base of the support stators 20 and 22 and provides attaching means to secure the stator apparatus 10 to the pickup bed 16. The platform base 32 is shown in top plan view in FIG. 3A with the stator apparatus 10 removed. The base 32 is comprised of a generally C-shaped planar member having a cross member 34, a side member 36 and a side member 38 extensive from the ends 40 and 42 respectively of the cross member 34. Disposed at intervals along the cross member 34 are the apertures 44, and located in the side members 36 and 38 are the apertures 46 and 48 respectively. Conventional bolt means 50 are disposed through the apertures 44, 46 and 48 to secure the base 32 to the top edge 52 of the bed 16 of the pickup truck vehicle 12. Appropriately placed threaded apertures are disposed in the top edge 52 of the pickup bed 16 to threadingly receive in locking engagement the bolts 50. While the platform base 32 is shown as providing attaching means for the stator apparatus 10 to the pickup 12 in the present disclosure, it will be understood that such attaching means is not considered controlling as to the application of the present invention, and other attaching means may be selected for mounting.

Disposed in the side member 36 is a pair of apertures 54. In like manner, a pair of apertures 56 are disposed through the side member 38. In the end 58 of the first support stator member 20 is a pair of apertures that align with the apertures 54 in the side member 36, the apertures disposed in 58 being threaded, or having an embedded nut therein to receive conventional bolts 60 that are disposed through the apertures 54 and threadingly engaged in the apertures disposed in the end 58 to secure the first support stator member to the platform base 32. In like manner, a pair of aligning apertures are disposed in the end 62 of the second support stator 22, and conventional bolts 64 are extended through the apertures 56 to threadingly engage the apertures disposed in the end 62 to secure the second support stator 22 to the platform base 32.

The provided attaching means adjusts the spatial and angular relationship between the stator assembly 10 and the pickup truck 12 so that the forward air shearing edges 28, 88 and 94 project into the bow wave airflow area generally indicated by the directional arrow 119. The forward air shearing edges 28, 88 and 94 directly deflects some of the bow wave air away from the bow wave airflow area 119 and into a totally bounded airflow channel created by the internal surfaces 26, 80 and 84 of the stator assembly 10 and the cab top 72 and cab sides 78 of the pickup truck 12 so as to form a first airflow area generally indicated by the directional arrow 122. The forward air shearing edges 28, 88 and 94 cause, by well-known aerodynamic affects, an indirect deflection of some of the bow wave air away from the bow wave flow area 119 and into a partially bounded airflow channel created by the external surfaces 24, 86 and 92 of the stator assembly 10. The velocity of the forward movement of the pickup truck 12 combines with natural wind affects in the ambient atmospheric air to establish the specific dimensional characteristics of the bow wave air flowstream but in all instances where the bow wave air flows in the area and direction indicated by the arrow 119 there will also be airflow in the area and direction indicated by the arrows 120 and 122.

At normal highway speeds under normal natural wind conditions the dimensional distance between the forward air shearing edges 28, 88 and 94 and the flow directing edges 30, 90 and 96 is adequate to stabilize the directional movement of the air in the first airflow area 122 so that it flows with converging streamlines to and through the space directly above the tailgate 17. Air moving through the second aiflow channel area 120 is so influenced by the external surfaces 24, 86 and 92 that it moves with diverging streamlines that are generally parallel to and concentric with the streamlines within the first airflow area 122. Air moving through the bow wave airflow area 119 moves generally parallel to and concentric with the streamlines within the second airflow area 120 and is specifically isolated from, and kept from coupling with, air moving in the first airflow area 122.

Shown in FIG. 1 is a cover assembly 116 depicted as sheltering the bed 16 of the pickup truck 16. Such covers are well known and will not be described herein except to reference the fact that the stator assembly 10 does not interfere with such installations or with the placement of cargo within the bed 16. It may be noted, however, that during transit cargoes placed in conventional pickup beds are subjected to damage due to high velocity winds that blow forward over the tailgate 17, scour the bed area and exit above and to the sides of the rear part of the cab in an extremely turbulent manner. The installation of a stator assembly 10 eliminates such problem and even protects the cargo area from falling precipitation as long as the vehicle maintains forward motion.

Returning to FIG. 2, it is clear that the first support stator 20 varies in width from the bottom end of 58 to the top end of 59, the bottom end 58 being of a generally narrow base as compared to the top end 59. The forward air shearing edge 88 extends from the end 58 to flow in a streamline, concave curve upwardly to blend with and attach to the main stator 18. The trailing flow directing edge 90 extends from the bottom end 58 upwardly in a general concave fashion to blendingly attach to the main stator 18. The concavity of the edges 88 and 90 as shown in FIG. 2 are selected to generally flow in an eye appealing fashion while yet further streamlining the stator apparatus 10. In like manner, although not shown in the Figures, the second support stator 22 is shaped to have an identical side view as shown for the first support stator 20 in FIG. 2, with the second support stator 22 blendingly attached to the main stator 18 in a manner that provides symmetry of design for the stator apparatus 10.

In the preferred form the main stator and the first and second support stators are integrally molded of a polymeric material, or these members may be fashioned of fiberglass or the like. In such cases, the attachment of the support stators 20 and 22 to the main stator member 18 is achieved by the molding process or by known welding techniques. In some cases, such as to facilitate shipping, it may be best to make the main stator 18 and the support stators 22 as separate components, in which case the support stators 20 and 22 may be attached to the main stator 18 by bolting means conventional in the fastening art.

OPERATION OF THE PREFERRED EMBODIMENT

The stator assemly 10 is attached to the vehicle 12 in the manner described heretofor, the main stator 18 being generally disposed and supported by the first and second support stators 20 and 22 and positioned by the platform base 32 so that the stator assembly 10 is positioned at a predetermined distance, and with predetermined angular relationships, above and around the cab 14.

The components of the stator assembly 10 are passive in that all of the components are fixed in stationary relationship to the pickup truck vehicle 12. Of course it will be recognized by persons skilled in the art that the components of the stator assembly 10 may be formed in a selection of standard sizes and known extension methods used at the time of initial installation to adjust a particular size to a specific make and model of pickup truck or other appropriate vehicle.

To properly understand the operation of the preferred embodiment it is necessary to understand the nature of the phenomena that establishes a forward flowing wake behind a forward moving vehicle wherein the wake flows forward faster than the vehicle so as to couple the forward flowing wake with a rearward flowing bow wave.

All vehicular wakes flow forward, in relationship from an undisturbed position to a position influenced by wake acceleration, but only a few wakes move forward at a velocity greater than the velocity of the vehicle forming the wake. Pickup trucks have a shape and size that, among other things, leads to the formation of counter-rotating twin vortices in the wake. In a pickup not protected by the present invention the vortices will spiral forward with a direction of rotation that establishes a horizontal vector of motion towards the extended longitudinal centerline of the vehicle in the lower portions of each vortex, with a horizontal vector of motion away from such centerline in the upper portion of each vortex. The point of confluence of these forward spiraling flowlines develops in the sheltered area immediately below and behind the tailgate of the forming vehicle when the vortices rotate in the described direction. The flowlines merge with an angular relationship that mutually transform pressure energy into kinetic energy and result in a forward accelerative force as the merged streams rise above the rearmost portion of the vehicle and are influenced by any low pressure area further forward, such as the low pressure area behind a pickup truck cab.

Conventional streamlining techniques generally concentrate on eliminating, by one means or another, mid-vehicular low pressure areas but the functional aspects of pickup truck operations do not lend themselves to such techniques. In mounting the stator apparatus 10 a predetermined distance above the cab 14 some portion of the rearward flowing bow wave air, resulting from the forward motion of the pickup truck 12, must be provided adequate diversion space for flow through the area between the interior surfaces 26, 80 and 84 of the stator assembly 10 and the exterior surfaces 72 and 78 of the cab 14. Air caused to flow through this first airflow area 122 provides the principal forces for the wake energization process previously described.

In mounting the stator apparatus 10 with a predetermined angular relationship to the pickup truck 12 some portion of the rearward flowing bow wave air, resulting from the forward motion of the pickup truck 12, must be provided diversion space immediately adjacent to the external surfaces 24, 96 and 92 of the stator assembly 10 so as to establish and maintain an airflow through the second airflow area 120. Air caused to flow through this second airflow area 120 isolates the first airflow area 122 from that air which has not been deflected from the bow wave airflow area 119. Failure to establish such proper angular relationship prevents the proper formation of the second airflow area 120 and allows air flowing through the bow wave airflow area 119 to couple with the vehicular wake so as to create the described conditions of a forward flowing wake which would block airflow of proper direction in the first airflow area 122.

The art of vehicular streamlining involves forming a structure that accommodates as many various considerations as possible in order to obtain planned objectives. The primary objective of the stator assembly 10 is the minimization of the mass of air disturbed by the relative motion of a pickup truck 12, or similar vehicle, through the ambient atmospheric air at normal highway speeds and the objective is achieved as planned when the cited structure is made and used as explained.

Another objective desired and achieved includes the attachment of the stator assembly 10 to the pickup truck 12 so that the increase of actual weight does not increase the effective weight while traveling at normal highway speeds. The aerodynamic lift imparted by the main stator 18 provides a degree of upward lift equal to or greater than the weight that is transferred to the bed 16 by the platform base 32 to prevent any increase of, or in some instances actually decrease, the rolling resistance of the pickup truck 12.

Another objective desired and achieved includes the shading of the glassed portion of the cab 14 by the configuration of the stator assembly 10 so as to improve vision by the reduction of reflected glare into the interior. Shading the cab 14 from the direct rays of the sun also reduces the need for cab interior cooling mechanisms because of the reduction of solar energy transferred through the cab external surfaces.

Another objective desired and achieved includes an improvement of vehicle handling accuracy and ease. Eliminating the strong turbulence normally present about the top of the cab 14 prevents steering interference and also reduces wind buffeting noises. Such accomplishments result from the decoupling of the bow wave and wake which would otherwise develop in a rather unstable condition.

Another desired and achieved objective includes the placement of the stator assembly 10 on the pickup truck 12 so as to prevent interference with the functional load capacity, not interfere with conventional loading and unloading procedures and to provide an additional degree of cargo protection from high speed winds that would otherwise be present in the bed 16 during travel at normal highway speeds.

Another objective desired and achieved includes economy of manufacture, simplicity of installation and lack of maintenance requirements.

It is clear that the present invention achieves the objects hereinabove stated. It will also be clear that changes may be made in the construction and arrangement of the parts or elements of the stator apparatus described herein without departing from the spirit and scope of the present invention as defined herein and within the appended claims.

What is claimed is:

1. In a vehicular system comprising a vehicle moving and forming a bow wave and a trailing wake in ambient air, the improvement comprising:

a main stator generally disposable a predetermined distance above and near a top surface of the vehicle, the main stator having an outer surface and an inner surface, the inner surface defining with the top surface of the vehicle a portion of a first air flow area, the outer and the inner surface of the main stator meeting to form a forward air shearing edge to cause air having relative motion to the main stator to separate into a first air portion flowing under the inner surface of the main stator and above the top surface of the vehicle in the first airflow area and a second air portion flowing over the outer surface, the outer surface and the inner surface of the main stator meeting to form a trailing flow directing edge, the first air portion and the second air portion being generally directed aft and downward toward and into the trailing wake of the vehicle, and the first air portion and the second air portion prevented by such motion from being coupled with the bow wave as the first air portion and the second air portion flow past the rear of the vehicle;

a first support stator attachable to and disposable near a first side of the vehicle and supporting the main stator, the first support stator having an outer surface and an inner surface, the inner surface defining with the first side of the vehicle another portion of the first airflow area, the inner surface and the outer surface of the first support stator meeting to form a forward air shearing edge to cause air having relative motion to the first support stator to separate into a first air portion flowing between the inner surface of the first support stator and the first side of the vehicle through the first airflow area and a second air portion flowing along the outside of the first support stator, the outer surface and the inner surface of the first support stator meeting to form a trailing flow directing edge, the first air portion and the second air portion being generally directed aft and inward and into the trailing wake of the vehicle, the first air portion and the second air portion prevented by such motion from being coupled with the bow wave as the first air portion and the second air portion flow past the rear of the vehicle; and a second support stator attachable to and disposable near a second side of the vehicle and supporting the main stator, the second support stator having an outer surface and an inner surface, the inner surface defining with the second side of the vehicle another portion of the second side of the vehicle another portion of the first flow area, the inner surface and the outer surface of the second support stator meeting to form a forward air shearing edge to cause air having relative motion to the second support stator to separate into a a first air portion flowing between the inner surface of the second support stator and the second side of the vehicle and a second air portion flowing along the outside of the second support stator, the outer surface and inner surface of the second support stator meeting to form a trailing flow directing edge, the first air portion and the second air portion being generally directed aft and inward and into the trailing wake of the vehicle, and the first air portion and the second air portion prevented by such motion from coupling with the bow wave air as the first air portion and the second air portion flow past the rear of the vehicle.

2. A vehicular apparatus externally mountable on a movable vehicle forming a bow wave and a trailing wake in the ambient air, comprising:

a main stator generally disposed and supported a predetermined distance above the vehicle, the main stator having an outer surface and an inner surface, the inner surface of the main stator defining with a portion of the vehicle surface a portion of a first air flow channel, the outer and inner surfaces of the main stator meeting to form an air shearing edge whereby air having relative motion to the main stator is caused to separate into a first air portion flowing through the first air flow channel and a second air portion flowing over the outer surface of the main stator, the outer surface and the inner surface of the main stator meeting to form a trailing flow directing edge whereby the first air portion and the second air portion are generally directed aft of the vehicle in a downward direction, and the first air portion and the second air portion having different energy contents effectuated by the main stator whereby the first air portion and the second air portion are caused to remain decoupled from the bow wave as the first air portion and the second air portion flow past the rear of the vehicle and into the trailing wake;

a first support stator attachable to the vehicle and supportingly connected to a first end of the main stator, the first support stator having an outer surface and an inner surface, the inner surface of the first support stator defining with a portion of the vehicle surface another portion of the first air flow channel, the inner surface and the outer surface of the first support stator meeting to form an air shearing edge whereby air having relative motion to the first support stator is caused to separate into a first air portion flowing through the first air flow channel and a second air portion flowing along the outer surface of the first support stator, the outer surface and the inner surface of the first support stator meeting to form a trailing flow directing edge whereby the first air portion and the second air portion are generally directed aft of the vehicle in an inward direction, and the first air portion and the second air portion having different energy contents effectuated by the first support stator whereby the first air portion and the second air portion are caused to remain decoupled from the bow wave as the first air portion and the second air portion flow past the rear of the vehicle and into the trailing wake; and a second support stator attachable to the vehicle and supportingly connected to a second end of the main stator, the second support stator having an outer surface and an inner surface, the inner surface of the second support stator defining with a portion of the vehicle surface another portion of the first air flow channel, the inner surface and the outer surface of the second support stator meeting to form an air shearing edge whereby air having relative motion to the second support stator is caused to separate into a first air portion flowing through the first air flow channel and a second air portion flowing along the outer surface of the second support stator, and the inner surface and the outer surface of the second support stator meeting to form a trailing flow directing edge whereby the first air portion and the second air portion are generally directed aft of the vehicle in an inward direction, and the first air portion and the second air portion having different energy contents effectuated by the second support stator whereby the first air portion and and the second air portion are caused to remain decoupled from each other as the first air portion and the second air portion flow past the rear of the vehicle and into the trailing wake.

* * * * *